United States Patent

Yamamoto et al.

[11] Patent Number: 6,010,648
[45] Date of Patent: Jan. 4, 2000

[54] PROCESS FOR THE PRODUCTION OF SPHERICAL CERAMIC GRANULES

[75] Inventors: Akira Yamamoto, Tokyo; Yoshie Tominaga, Saitama-ken, both of Japan

[73] Assignee: Asahi Kogaku Kogyo Kabushiki Kaisha, Tokyo, Japan

[21] Appl. No.: 09/086,558

[22] Filed: May 29, 1998

[30] Foreign Application Priority Data

Jun. 2, 1997 [JP] Japan ................................. 9-144019

[51] Int. Cl.⁷ .................................................. B22D 11/01
[52] U.S. Cl. ............................................. 264/15; 264/678
[58] Field of Search ............................... 264/15, 678

[56] References Cited

U.S. PATENT DOCUMENTS

| | | | |
|---|---|---|---|
| 4,113,500 | 9/1978 | Ebihara et al. | 106/39.5 |
| 4,149,894 | 4/1979 | Ebihara et al. | 106/39.5 |
| 4,781,904 | 11/1988 | Tagaya et al. | 423/308 |
| 4,957,674 | 9/1990 | Ichitsuka et al. | 264/65 |
| 5,039,408 | 8/1991 | Ichitsuka et al. | 210/198.2 |
| 5,064,436 | 11/1991 | Ogiso et al. | 623/16 |
| 5,089,195 | 2/1992 | Ichitsuka et al. | 264/65 |
| 5,158,756 | 10/1992 | Ogawa et al. | 423/309 |
| 5,171,720 | 12/1992 | Kawakami | 501/80 |
| 5,520,860 | 5/1996 | Tapper et al. | 264/15 |
| 5,720,909 | 2/1998 | Campion et al. | 264/15 |
| 5,725,813 | 3/1998 | Nies | 264/15 |

FOREIGN PATENT DOCUMENTS

| | | |
|---|---|---|
| 3-252304 | 11/1991 | Japan . |
| 944936 | 12/1963 | United Kingdom . |
| 1326521 | 8/1973 | United Kingdom . |

*Primary Examiner*—Christopher A. Fiorilla
*Attorney, Agent, or Firm*—Greenblum & Bernstein, P.L.C.

[57] ABSTRACT

Production process for spherical ceramic granules which includes pulverizing a dried product of a ceramic material; calcinating the pulverized product at a temperature of about 300 to 900° C.; rotating the calcinated granules to make spherical granules; and firing the spherical granules. The spherical ceramic granules have no corner or sharp edge and projection, and thus show a high fluidity property and excellent operability.

8 Claims, No Drawings

PROCESS FOR THE PRODUCTION OF SPHERICAL CERAMIC GRANULES

BACKGROUND OF THE INVENTION

1. Field of the invention

The present invention relates to a process for the production of spherical ceramic granules.

2. Description of the Related Art

Hitherto, as the production method of porous ceramic granules, there are well-known the following methods:

1) the method in which a slurry of the starting ceramic powders is mixed with a foaming agent such as hydrogen peroxide and the like, the mixture is heated at about 70 to 120° C. to dry the mixture along with foaming, and the dried and foamed product is pulverized after firing;

2) the method in which a slurry of the starting ceramic powders is mixed with a thermally dissipatable substance, and the mixture is pulverized after drying and firing; and 3) the method in which a slurry of the starting ceramic powders is mixed with a thermally dissipatable substance acting as a thickening agent and, if desired, a foaming agent, the mixture is stirred to cause thickening or gelation of the slurry, and the slurry is dried while retaining the generated foams therein, and, if desired, calcinating the same, and the dried product is subjected to a pulverizing and firing process in any desired order (see, Japanese Unexamined Patent Publication No. 3-252304). Among these three methods, in particular, the third method enables the production of porous ceramic granules having a high porosity which contain, in addition to spherical micropores produced upon foaming, three-dimensionally communicating micropores formed between the adjacent particles of the starting ceramic powders.

However, the granules formed by these prior art methods have a drawback that the shape of the granules is still similar to the shape after the pulverizing process. That is, just after pulverization, the granular particles still have sharp edge portions which cause a reduction of the fluidity of the particles, and thus an insufficient operability of the granules has been a problem to be solved.

SUMMARY OF THE INVENTION

The object of the present invention is to solve the above-described prior art problems, thereby producing spherical particles having a rounded surface, i.e., the spherical particles having no sharp edges and projection, and provide a process for the production of spherical ceramic granules having a high fluidity property and showing an excellent operability with high production efficiency.

The inventors have found that, if the granules produced by pulverization are rotated, sharp edges and projections of the pulverized granules are removed from the surface of the granules, thereby enabling production of the spherical ceramic granules having the high fluidity.

In other words, the production process for spherical ceramic granules according to the present invention is characterized in that the process comprises the steps of:

pulverizing a dried product of a ceramic material;

calcinating the pulverized product at a temperature of about 300 to 900° C.;

rotating the calcinated granules to make spherical granules; and firing the spherical granules.

According to another aspect of the present invention, the production process for spherical ceramic granules according to the present invention is characterized in that the process comprises the steps of:

pulverizing a dried product of a ceramic material;

calcinating the pulverized product at a temperature of about 300 to 900° C.;

filling said resulting granules in a container;

rotating the container so that the granules are converted to spherical granules, and firing the spherical granules.

It should be noted that the terms "granules" and "granular particles" mean particles with corners or sharp edges and projections, and the terms "spherical granules" and "spherical granular particles" mean spherical particles having no corners or sharp edges and projections.

The present disclosure relates to subject matter contained in Japanese Patent Application No. 09-144019 (filed on Jun. 2, 1997) which is expressly incorporated herein by reference in its entirety.

DESCRIPTION OF THE PREFERRED EMBODIMENTS

According to the production process of the present invention, a dried product of the ceramic material is pulverized and calcined at a temperature of about 300 to 900° C., followed by rotating the calcined granular particles to make spherical granules. Generally, since the sintered granular particle has a very high hardness, the sintered granular particles are difficult to be rounded to make spherical particles, or, even if it is possible to obtain spherical particles, fabrication or processing requires much time to form such particles. Contrary to the above, according to the present invention, after drying a slurry of the ceramic powders, the dried product is pulverized and classified through a sieve or other means to obtain granules having a desired size. The thus-obtained granules are spread, and after a calcination process through which the granules are calcinated to a degree that the granules are not completely sintered. The calcined granulates are rotated in a ball mill or other rotating means.

In the present invention, the dried product of the ceramic material may be either a dense body or a porous material, or, the dried product may be the material capable of being converted into a porous material upon firing. The dried dense product can be produced in accordance with any conventional methods including a hydrostatic press method and the like. The dried porous product or the dried product capable of being converted into a porous body upon firing can be produced by anyone of the above-described prior art methods 1) to 3). However, it should be noted that the rotation of the granules produced by pulverization of the dried product, in a ball mill and the like may cause a disintegration or destruction of the granules themselves, which means that the granules do not hold the solid shape, but are disintegrated into powders such as the starting ceramic powders. Even if the rotated granular particles can hold their shape, a yield of the spherical particles as the target is lowered due to destruction of the granular particles. Accordingly, in the present invention, the pulverized granules are rotated, after they were calcined to a degree that the pulverized granules are not completely sintered.

With regard to the dried product of the ceramic material, it is preferable to use the dried product produced according to the above-described prior art method 2) or 3), more concretely, the dried product obtained by drying a slurry of the ceramic material to which a thermally dissipatable substance consisting of a polymeric substance, or a thermally dissipatable substance acting as a thickening agent, in accordance with the prior art method 2) or 3) is added. This is because the dried product according to the method 2) or 3) can diminish a brittleness which is commonly observed in the dried product of the slurry, and thus ensuring an excellent ease of fabrication or processing.

As the thermally dissipatable substance, cellulose derivatives such as methyl cellulose and the like, polysaccharides such as curdlan and the like, and synthetic polymers such as polyvinyl alcohol, polyacrylic acid, polyacrylamide and polyvinyl pyrrolidone and the like. These substances may be used alone or in combination.

The amount of the thermally dissipatable substance added to the slurry may be suitably determined depending upon factors such as the properties of the used substance and the desired porosity, and the thermally dissipatable substance is preferably added to the slurry so that the amount of the thermally dissipatable substance in the slurry is in the range of about 0.0001 to 50% by weight. The thermally dissipatable substance less than about 0.0001% by weight will lose the binding effect of the dried product, thereby resulting in powder-like products, whereas the thermally dissipatable substance above about 50% by weight will cause an excessive increase of the viscosity of the slurry, thereby resulting in a poor mixing of the powders and liquid, and uneven distribution of the generated foams.

After pulverization, the dried product of the ceramic material is classified by a sieve or the like to obtain granules having a desired distribution of particle size. The granules are then spread over a spreading means such as a sheath made of alumina, and calcinated with the care that the granules are not sintered. As a result of this calcination process, the granular particles are provided with a suitable strength which is sufficient to prevent destruction of the particles during the rounding or sharp edges-removing step of the particles by rotation. Generally, the calcination process may be carried out at a temperature of about 300 to 900° C. The calcination temperature below about 300° C. will cause a destruction of the granular particles during the rounding step of the same through rotation, and will change the particles into the starting powders. On the other hand, firing the granular particles at the temperature above about 900° C. will cause sintering of the granular particles, thereby resulting in difficulty of obtaining rounded surfaces, i.e., difficulty in the removal of corners or sharp edges and projections from the surfaces of the granular particles, due to an increase of the strength.

The granules obtained upon the above calcination process are then rotated to obtain spherical granules. The rotation process may be carried out by any suitable rotating means such as a ball mill, stirrer and the like.

In this rotation process of the granules, it is preferable to increase a rotation speed to shorten a working time, however, an excessively increased rotation speed should be avoided, because it causes an adhesion of the granular particles onto a wall surface of the container of the rotating means. For the rotation process using the ball mill, to obtain a suitable rotation for the granular particles, it is required to reduce a rotation speed of the mill, while continuing the rotation process for a predetermined extended period of time. Accordingly, a rotation speed may be suitably determined in consideration of the processing time, for example, when the rotation speed is in the range of about 50 to 500 revolutions per minute (r.p.m.), it is preferable to set the processing time in the range of about 0.5 to 20 hours. Under these conditions, it becomes possible to control the amount of the granules which will be destroyed by balls in the ball mill up to an acceptable level. The resulting fine powders can be classified by a sieve and the like.

For the balls to be put in the ball mill, it is preferable to use ones made of zirconia, alumina and the like. Furthermore, it is preferable that the balls are filled in the ball mill in an amount of about 30 to 40% of the entire volume of the ball mill.

As an alternative, it is also possible to rotate the granules obtained upon calcination while the granules are being put in a container, which means that the container itself is rotated by the ball mill. Even with such a process, power of rotation is transmitted to the granules through the rotated container. Upon this rotation of the granules, it becomes possible to obtain the spherical granular particles having a configuration similar to that of the stones frequently found in a riverbed.

As the container, it is preferable to employ a plastic container with a lid, made of polypropylene, polyethylene or other plastic materials. For example, a cylindrical container with a lid can be used.

When the container is rotated with the granules being filled therein, a liquid having properties of being dissipated during the firing, and of no or low solubility with regard to a starting powder of the granules, can be contained in the container. The dissipatable liquid usable herein is water or a lower alcohol, such as methanol, ethanol and the like.

Since the addition of the above-described liquid to the container can improve the fluidity of the granular particles, it becomes possible to conduct the rotation process at a higher rotation speed and also conduct a rapid dispersion of fine powders, produced during the rotation process, in a liquid phase, thus improving an efficiency of the rounding process through which corners or sharp edges and projections are removed from the surfaces of the granular particles.

It should be noted that the fine powders produced during the rotation process using a ball mill can be easily removed from the liquid phase by repeating a removing operation of the upper liquid layer, obtained immediately after the container (e.g., a cylindrical container) is made to stand vertically so that the spherical granules are precipitated. The removing operation is preferably repeated three times.

The obtained spherical granules are then fired to produce porous spherical granular particles of the ceramic material. The firing temperature may be suitably chosen depending upon the type of the ceramic material used. Furthermore, it is preferable that the firing temperature is selected in view of the desired pore size, porosity and other factors, because pore size and porosity may be affected by the firing temperature. For example, when the calcium phosphate compound is used as the ceramic material, it is preferable that the firing temperature is chosen from the range of from about 900° C. to about 1,400° C.

The production process according to the present invention can be advantageously applied to the production of spherical ceramic granules from a wide variety of ceramics such as calcium phosphate-based ceramic material, alumina-based ceramic material, silica-based ceramic material, zirconia-based ceramic material and other ceramic materials. Furthermore, the production process can be applied to the production of various types of products and articles, typical examples of which include an artificial biomaterial, an adsorbing agent, a filler of a column for liquid chromatography, a carrier of catalysts and the like.

EXAMPLES

The present invention will be further described with reference to its examples. Note, however, that the appended examples do not restrict the scope of the present invention. Furthermore, it should be noted that (1) the ball mill comprises a rotation controlling member, such as a motor, etc., and a hollow rotating member to be rotated by the rotation controlling member; (2) the container is intended to be used in the hollow rotating member, and (3) filling the granular particles directly in the ball mill means to fill the granular particles directly into the rotating member without using the container.

Example 1

(1) Preparation of Granular Particles 140 g of starting powders, obtained by mixing hydroxyapatite powders having an average particle size of 10 $\mu$m and hydroxyapatite powders having an average particle size of 1 $\mu$m with the weight ratio of 1:0.03, (hereinafter, referred briefly to as "hydroxyapatite powders") were suspended in 200 ml of an aqueous 1 weight % solution of methyl cellulose, and the suspension was dried at a temperature of 80° C. for 36 hours. The dried product having a porosity of 50% was pulverized in a mortar. After the resulting particles were classified through a sieve to obtain particles having a particle size of 0.2 to 1.0 mm, the particles were calcined at 700° C. for 2 hours. Granular particles were thus obtained.

(2) Production of Spherical Granules

The granular particles obtained in the above step (1) were added to the container to be put in the ball mill, and the ball mill was rotated at a rotation speed of 100 rpm for 12 hours to obtain spherical granules. The spherical granules were classified by a sieve to obtain granules having a particle size of not less than 0.1 mm. Then, the granules were fired at 1,200° C. for 4 hours. Porous and spherical ceramic granules consisting of hydroxyapatite having a porosity of 20% were thus obtained.

Example 2

After the granular particles were prepared in accordance with the method similar to that of the step (1) of Example 1, the granular particles were filled in the container together with water of the same volume as that of the granular particles, and the ball mill was rotated. Since fluidity of the granular particles was improved as a result of addition of water, the spherical granular particles which were substantially the same as those obtained in Example 1 could be obtained upon rotation of the container at 300 rpm for 5 hours. The fine powders produced during the rotation process could be removed by removing the upper liquid layer obtained immediately after the container was made to stand vertically so that the spherical granules were precipitated. The removing operation was preferably conducted three times.

The obtained spherical granules were fired at 1200° C. for 4 hours. Porous and spherical ceramic granules consisting of hydroxyapatite having a porosity of 20% were thus obtained.

Example 3

The procedure of Example 2 was repeated with the provision that the same amount of ethanol was filled, in place of water, in the container. Porous and spherical ceramic granules consisting of hydroxyapatite having a porosity of 20% were thus obtained.

Example 4

After the granular particles were prepared in accordance with the method similar to that of the step (1) of Example 1, the granular particles were directly filled in a ball mill in which zirconia balls are contained in the amount of about 35% of total volume of the ball mill, and the ball mill was rotated at 100 rpm for 5 hours to obtain spherical granules. Then, the obtained spherical granules were fired at 1,200° C. for 4 hours. Porous and spherical ceramic granules consisting of hydroxyapatite having a porosity of 20% were thus obtained.

Comparative Example 1

After the granular particles were prepared in accordance with the method similar to that of the step (1) of Example 1, the granular particles were fired at 1,200° C. for 4 hours. Porous ceramic granules consisting of hydroxyapatite having a porosity of 20% were thus obtained.

The obtained granular particles still hold corners or sharp edges in the surface as just after the granular particles were pulverized. Therefore, the granular particles inevitably has a poor fluidity property, so that the granular particles may cause a problem in operations depending on the purpose of the use.

Comparative Example 2

After the dried product was prepared in accordance with the method similar to that of the step (1) of Example 1, the dried product was pulverized to obtain granular particles. No calcination of the particles at 700° C. was made.

The obtained granular particles were filled in the container, and water of the same volume as that of the granular particles was added to the container. The container was rotated with the ball mill at 300 rpm for 5 hours. Substantially most of the granular particles were destroyed upon the rotation of the ball mill into the starting hydroxyapatite powders.

Example 5

140 g of starting powders (hereinafter, referred briefly to as "tricalcium phosphate powders"), obtained by mixing tricalcium phosphate powders having an average particle size of 10 $\mu$m and tricalcium phosphate powders having an average particle size of 1 $\mu$m in a weight ratio of 1:0.03, were suspended in 200 ml of an aqueous 1 weight % solution of methyl cellulose, and the suspension was dried at a temperature of 80° C. for 36 hours. The thus dried product having a porosity of 50% was pulverized in a mortar. After the resulting particles were classified by a sieve to obtain particles having a particle size of 0.2 to 1.0 mm, the particles were calcined at 700° C. for 2 hours. Granular particles were thus obtained.

The granular particles obtained in the above step were filled in the container, and water of the same volume as that of the granular particles was filled therein as well. The container was then rotated with the ball mill at 300 rpm for 5 hours to obtain spherical granules. The fine powders produced during the rotation process could be removed by removing a supernatant obtained immediately after the container was made to stand vertically so that the spherical granules were precipitated. The removing operation was preferably conducted three times.

The obtained spherical granules were fired at 1,200° C. for 4 hours. Porous and spherical ceramic granules consisting of tricalcium phosphate having a porosity of 20% were thus obtained.

Example 6

The hydroxyapatite powders were filled in a mold made of the acetal resin, commercially available under the trade designation "Derlin" from DuPont, and the powders were pressurized in a hydraulic press machine to obtain compressed powders. After vacuum packaging of the compressed powders in a vinyl pouch, the powders were pressurized under the pressure of 2,000 kg/cm2 in a hydrostatic press. The compressed powders were pulverized in a mortar, and after classification by a sieve to obtain particles having a particle size of 0.2 to 1.0 mm, the particles were calcined at 700° C. for 2 hours. The granular particles were thus obtained.

The obtained granular particles were subjected to the rotation and firing process in accordance with the method similar to that of the step (2) of Example 1. The dense spherical ceramic granules consisting of hydroxyapatite were thus obtained.

As explained, the spherical ceramic granules, having no corner or sharp edges and projections in the surface thereof and showing a high fluidity property and excellent operability, can be easily produced. Accordingly, the spherical ceramic granules obtained by using the production process of the present invention are advantageously used as an artificial biological material, an adsorbing agent, a filler of a column for liquid chromatography, a carrier of catalysts and the like.

What is claimed is:

1. A method for producing spherical ceramic granules, which comprises:

pulverizing a dried product comprising a body composed of ceramic powder material thereby producing pulverized granules;

calcinating said pulverized granules at a temperature of about 300 to 900° C. to provide the granules with suitable strength to prevent destruction of the granules during the following step;

rotating said calcinated granules to make spherical granules; and firing said spherical granules.

2. The method for producing spherical ceramic granules according to claim 1, wherein said dried product of said ceramic powder material is a product obtained by drying a slurry of said ceramic material to which a thermally dissipatible substance is added.

3. The process for producing spherical ceramic granules according to claim 2, wherein said thermally dissipatable substance is at least one member selected from the group consisting of methyl cellulose, curdlan, polyvinyl alcohol, polyacrylic acid, polyacrylamide and polyvinyl pyrolidone.

4. A method for producing spherical ceramic granules, which comprises:

pulverizing a dried product comprising a body composed of ceramic powder material thereby producing pulverized granules;

calcinating said pulverized granules at a temperature of about 300 to 900° C. to provide the granules with suitable strength to prevent destruction of the granules during the following step;

filling said resulting granules in a container;

rotating said container so that said granules are converted to spherical granules; and firing said spherical granules.

5. The process for the production of spherical ceramic granules according to claim 4, wherein said container is a plastic container provided with a lid.

6. The process for the production of spherical ceramic granules according to claim 5, wherein said granules are filled in the container, along with a liquid capable of being dissipated during said firing, said liquid having no or low solubility with respect to a starting powder of said granules.

7. The process for the production of spherical ceramic granules according to claim 4, wherein said granules are filled in the container, along with a liquid capable of being dissipated during said firing, said liquid having no or low solubility with respect to a starting powder of said granules.

8. The process for producing spherical ceramic granules according to claim 7, wherein said dissipatable liquid is water or a lower alcohol.

* * * * *